(12) United States Patent
Oh

(10) Patent No.: US 11,353,077 B2
(45) Date of Patent: Jun. 7, 2022

(54) LEAF SPRING

(71) Applicants: HYUNDAI MOTOR COMPANY, Seoul (KR); KIA MOTORS CORPORATION, Seoul (KR)

(72) Inventor: Seung Hyun Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 280 days.

(21) Appl. No.: 16/816,677

(22) Filed: Mar. 12, 2020

(65) Prior Publication Data

US 2021/0095734 A1 Apr. 1, 2021

(30) Foreign Application Priority Data

Sep. 26, 2019 (KR) .................. 10-2019-0118589

(51) Int. Cl.
| | | |
|---|---|---|
| *F16F 1/368* | (2006.01) | |
| *B60G 11/113* | (2006.01) | |
| *B60G 11/02* | (2006.01) | |
| *B60G 11/04* | (2006.01) | |
| *B60G 11/10* | (2006.01) | |

(Continued)

(52) U.S. Cl.
CPC .... *F16F 1/3683* (2013.01); *F16F 2224/0241* (2013.01); *F16F 2226/041* (2013.01); *F16F 2238/022* (2013.01)

(58) Field of Classification Search
CPC ............. F16F 1/3683; F16F 2224/0241; F16F 2226/041; F16F 2238/022; F16F 2230/36; F16F 1/182; B60G 11/113; B60G 2202/112; B60G 2204/121; B60G 2204/4306; B60G 2206/7101; B60G 2206/8207; B60G 11/04; B60G 11/10; B60G 11/02; B60G 11/12; B60G 11/125; B60G 2204/43; B60G 2206/017; B60G 2400/61; F16B 5/02
See application file for complete search history.

(56) References Cited

U.S. PATENT DOCUMENTS

| | | | | |
|---|---|---|---|---|
| 1,495,117 A | * | 5/1924 | Walder | ............... F16F 1/182 267/47 |
| 3,749,389 A | * | 7/1973 | Duchemin | ............ F16F 1/182 267/52 |

(Continued)

FOREIGN PATENT DOCUMENTS

| | | | |
|---|---|---|---|
| KR | 10-2019-0083518 A | 7/2019 | |
| WO | WO-2021156219 A1 * | 8/2021 | ............ B60G 7/02 |

*Primary Examiner* — Jonathan Ng
*Assistant Examiner* — Daniel M. Keck
(74) *Attorney, Agent, or Firm* — Lempia Summerfield Katz LLC

(57) ABSTRACT

A leaf spring may include: an upper plate provided with arc-shaped portions which are integrally formed on both end portions thereof, respectively, for forming spring eyes; a lower plate disposed to overlap a lower side of the upper plate and provided with arc-shaped portions which are integrally formed on both end portions thereof, respectively, and face the arc-shaped portions of the upper plate to form the spring eyes; clamping units installed to restrain the both end portions of the overlapped upper and lower plates from being separated from each other; and a central fastening unit configured to fasten central portions of the overlapped upper and lower plates.

11 Claims, 5 Drawing Sheets

(51) Int. Cl.
  *B60G 11/12* (2006.01)
  *F16B 5/02* (2006.01)
  *F16F 1/18* (2006.01)

(56) References Cited

U.S. PATENT DOCUMENTS

| | | | | |
|---|---|---|---|---|
| 5,228,665 A | * | 7/1993 | Berghus | F16F 1/182 |
| | | | | 267/260 |
| 2008/0128968 A1 | * | 6/2008 | Platner | B60G 11/10 |
| | | | | 267/260 |
| 2010/0127444 A1 | * | 5/2010 | Glass | B60G 11/12 |
| | | | | 267/264 |

* cited by examiner ly, a lower side of the overlapped upper and lower plates,
LEAF SPRING

CROSS REFERENCE TO RELATED APPLICATION

This application claims priority to and the benefit of Korean Patent Application No. 10-2019-0118589, filed on Sep. 26, 2019, the entire contents of which are incorporated herein by reference.

FIELD

The present disclosure relates to a configuration of a leaf spring.

BACKGROUND

The statements in this section merely provide background information related to the present disclosure and may not constitute prior art.

Both end portions of a leaf spring are connected to a vehicle frame and a central portion is connected to an axle by using a U-shaped bolt, and so the leaf spring can elastically support the axle with respect to the vehicle frame and transmit a driving force, a braking force as well as an axle force to a vehicle body itself.

A conventional leaf spring is mainly made of steel material, which has been a factor to increase a weight of vehicle. In recent years, a technique for improving fuel efficiency of a vehicle by reducing a weight using a composite material such as fiber reinforced plastic (FRP) has been developed.

The foregoing is intended merely to aid in the understanding of the background of the present disclosure, and is not intended to mean that the present disclosure falls within the purview of the related art that is already known to those skilled in the art.

SUMMARY

The present disclosure provides a leaf spring which is made of a composite material and is capable of further reducing a weight of vehicle with a simple configuration, and effectively distributing stress in a region where stress can be concentrated, thereby increasing robustness thereof and reducing the manufacturing cost.

In one form of the present disclosure, a leaf spring may include: an upper plate provided with first arc-shaped portions which are integrally famed on both end portions thereof, respectively, for forming spring eyes; a lower plate disposed to overlap a lower side of the upper plate and provided with second arc-shaped portions which are integrally formed on both end portions thereof, and configured to respectively face the first arc-shaped portions of the upper plate to form the spring eyes; clamping units configured to restrain the both end portions of the overlapped upper and lower plates from being separated from each other; and a central fastening unit configured to fasten central portions of the overlapped upper and lower plates.

In one form, a bush may be inserted into each of the spring eyes formed by the first and second arc-shaped portions of the upper plate and the lower plate.

The upper plate and the lower plate may be spaced apart from each other to form a first gap near the bush.

In one form, a depression portion configured to form the first gap may be formed on at least one of the upper plate or the lower plate overlapping each other, and the depression portion may be formed by depressing a contact surface between the upper plate and the lower plate.

In another form, a size of the first gap may be adjusted by a diameter of the bush inserted into the spring eye.

In other form, an outer side of the first arc-shaped portion of the upper plate is configured to protrude upward, and an outer side of the second arc-shaped portion of the lower plate is configured to protrude downward.

The upper plate and the lower plate may be formed to have the same shape, and may be symmetrically coupled to each other to form the spring eyes.

The clamping unit may include an upper sheet provided with an arc-shaped cross-sectional portion surrounding the first arc-shaped portion of the upper plate and flat portions extending from both sides of the arc-shaped cross-sectional portion of the upper sheet, respectively; a lower sheet provided with an arc-shaped cross-sectional portion surrounding the second arc-shaped portion of the lower plate and flat portions extending from both sides of the arc-shaped cross-sectional portion of the lower sheet, respectively; and a plurality of fasteners configured to pass through and fasten the upper sheet and the lower sheet placed on an upper side and a lower side of the overlapped upper and lower plates, respectively.

The upper sheet and the lower sheet may be formed to have the same shape, and may be symmetrically coupled to each other in a state in which the overlapped upper and lower plates are interposed therebetween.

In a state in which the upper sheet and the lower sheet are placed on the upper side and the lower side of the overlapped upper and lower plates, respectively, a second gap may be formed between an outer flat portion of the upper sheet and an outer flat portion of the lower sheet before the upper and lower sheets are tightened by the plurality of fasteners.

The plurality of fasteners may include at least one first bolt passing through and fastening an inner flat portion of the upper sheet, the upper plate, the lower plate, and an inner flat portion of the lower sheet so as to reduce the first gap; and at least one second bolt passing through and fastening the outer flat portion of the upper sheet and the outer flat portion of the lower sheet so as to reduce the second gap.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
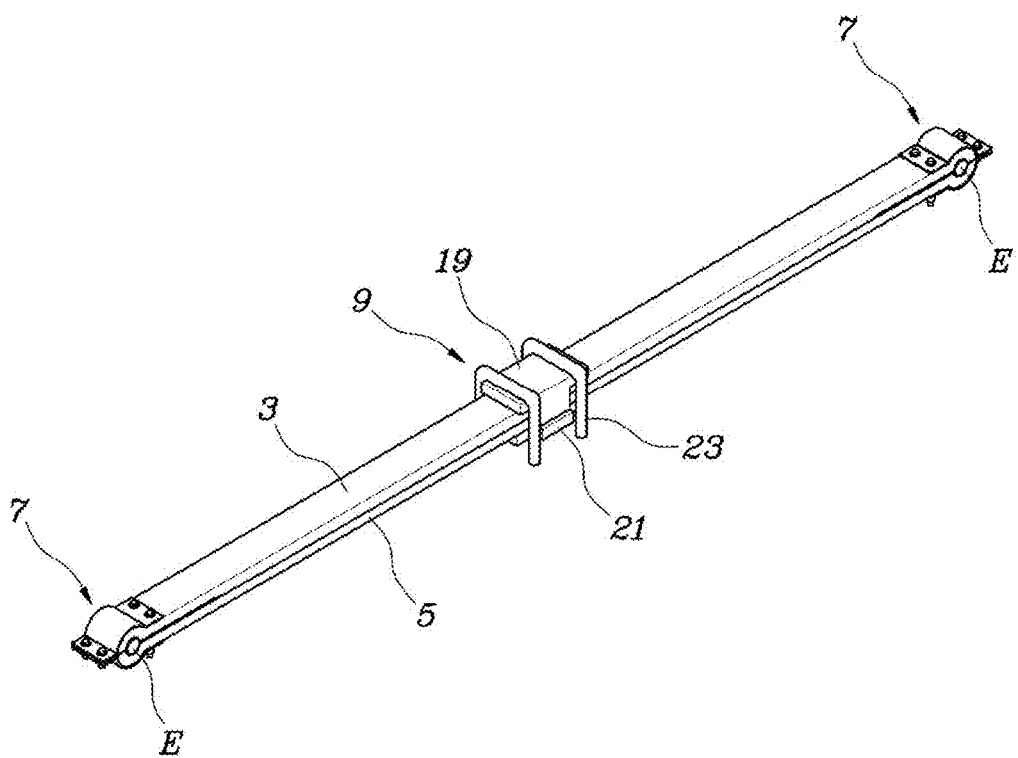
FIG. 1 is a perspective view illustrating a leaf spring as assembled.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A leaf spring according to exemplary forms of the present disclosure will be described below with reference to the accompanying drawings.

Referring to FIGS. 1 to 5, a leaf spring according to one form of the present disclosure includes: an upper plate 3 provided with arc-shaped portions 1 which are integrally formed on both end portions thereof, respectively, for forming spring eyes E; a lower plate 5 disposed to overlap a lower side of the upper plate 3 and provided with arc-shaped portions 1 which are integrally famed on both end portions thereof, respectively, and face the arc-shaped portions 1 of the upper plate 3 to form the spring eyes E; clamping units 7 installed to restrain the both end portions of the overlapped upper and lower plates 3 and 5 from being spread from each other; and a central fastening unit 9 configured to fasten central portions of the overlapped upper and lower plates 3 and 5.

In other words, in the present form, the upper plate 3 and the lower plate 5 made of a composite material are integrated by means of the clamping units 7 and the central fastening unit 9, are mounted to a vehicle frame 11 through the clamping units 7, and are connected to an axle 13 through the central fastening unit 9 to consequently performs a function of elastically supporting the axle 13 to the vehicle frame 11.

For reference, the front spring eye E of the leaf spring is mounted to the vehicle frame 11 through a mounting bracket 15, the rear spring eye E is mounted to the vehicle frame 11 via a shackle 17, and the central fastening unit 9 includes an upper body 19, a lower body 21 and a U-shaped bolt 23 fastened to the axle 13 while surrounding the upper body 19 and the lower body 21.

In one form, a bush 25 is inserted into each spring eye E formed by the arc-shaped portions 1 of the both ends of the upper and lower plates 3 and 5.

That is, the bush 25 may be made of a durable material and formed into a pipe shape to maintain a state in which the leaf spring is securely and durably coupled to the mounting bracket 15 and the shackle 17 with a pin.

The upper plate 3 and the lower plate 5 around the bush 25 are spaced apart from each other to form a first gap G1.

Figures 4A, 4B:
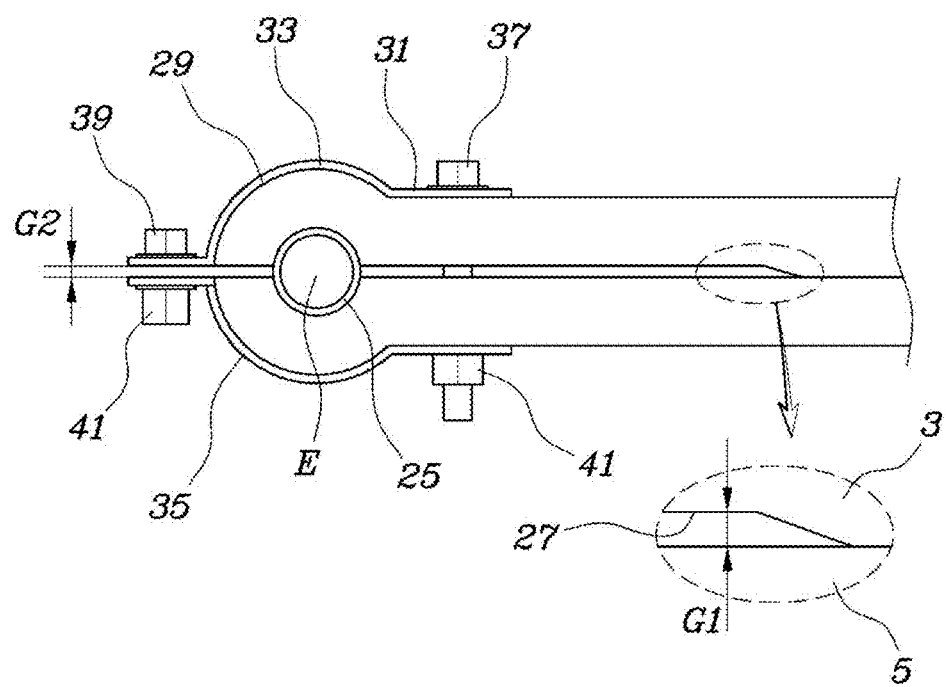
FIG. 4A is a side view of a part of FIG. 3.
FIG. 4B is an enlarged view of a part in FIG. 4A.
Figure 5:
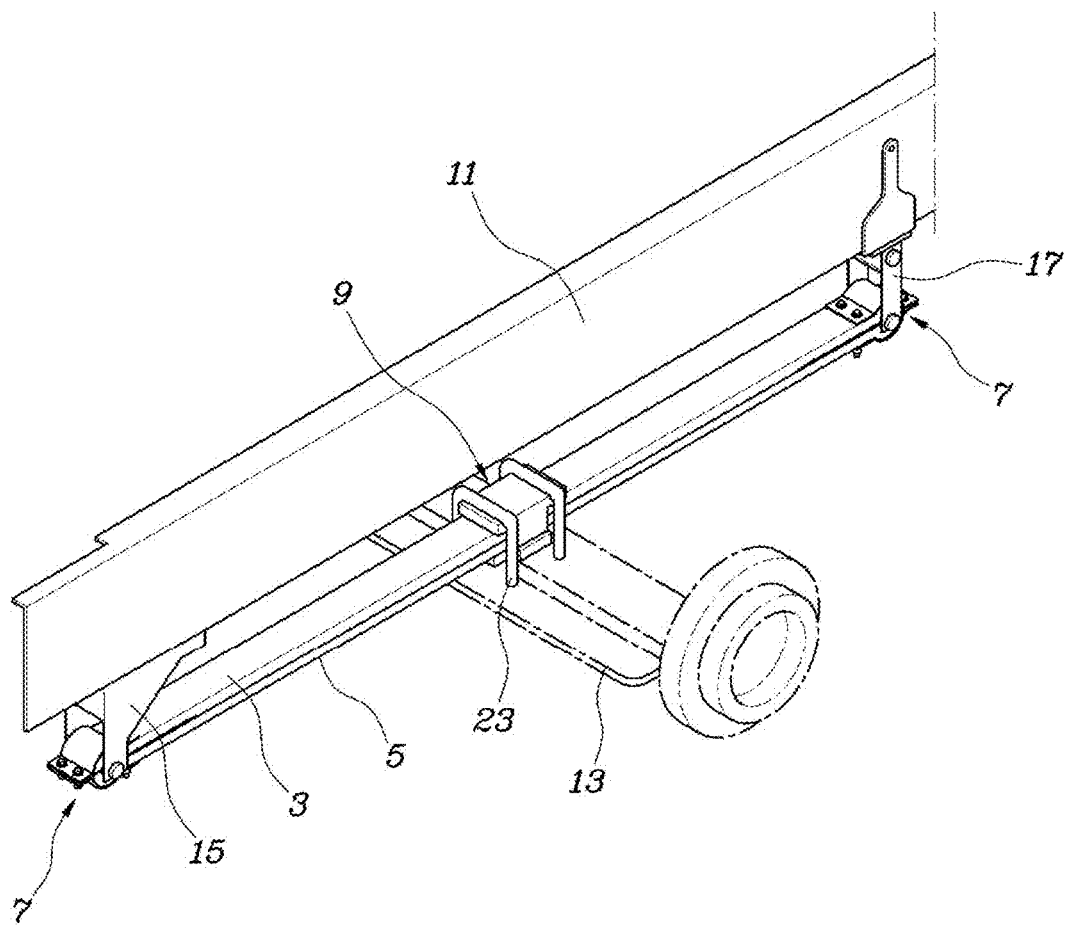
FIG. 5 is a view exemplarily illustrating a state in which the leaf spring is applied to a vehicle.

The first gap G1 may be formed by a depression portion 27 formed on at least one of the upper plate 3 or the lower plate 5 overlapping each other, and this depression portion 27 is formed by depressing a contact surface between the upper plate 3 and the lower plate 5. As illustrated in FIGS. 4A and 4B, the contact surface can be a lower side surface of the upper plate 3 which faces the lower plate 5 near the spring eye E.

That is, the first gaps G1 may be formed by forming the depression portions 27 (e.g., recesses or grooves) on lower sides of both end portions of the upper plate 3, the first gaps G1 may also be formed by forming the depression portions 27 on upper sides of both end portions of the lower plate 5, or the first gaps G1 may also be formed by forming the depression portions 27 on lower sides of both end portions of the upper plate 3 and on upper sides of both end portions of the lower plate 5.

For reference, FIGS. 4A and 4B exemplarily illustrates that the first gaps G1 are formed by the depression portions 27 formed only on lower sides of both end portions of the upper plate 3.

On the other hand, a size of the first gap G1 may be configured to be adjusted by a diameter of the bush 25 inserted into the spring eye E.

That is, when the diameter of the bush 25 is increased in a state where the spring eye E is constant, the size of the first gap G1 is increased, and when the diameter of the bush 25 is decreased, the size of the first gap G1 is reduced.

Therefore, in a state where the depression portion 27 as described above is not provided, the first gap G1 may be formed just by inserting the bush 25, which is somewhat larger than the spring eye E, into the spring eye E.

On the other hand, the upper plate 3 is configured to allow a portion of an outer side of the arc-shaped portion 1 thereof to protrude upward; and the lower plate 5 is configured to allow a portion of an outer side of the arc-shaped portion 1 thereof to protrude downward.

As such, the configuration in which the outer sides of the arc-shaped portions 1 of the upper plate 3 and the lower plate 5 protrude upward and downward makes it possible to sufficiently secure a strength of the portion where the spring eye E is formed, while the upper plate 3 and the lower plate 5 are formed to have a relatively thin thickness, as well as enables the end portions of the upper plate 3 and the lower plate 5 to be kept in a more secure coupled state by the clamping unit 7 described later.

The upper plate 3 and the lower plate 5 may be configured to have the same shape and to be symmetrically coupled to each other so as to form the spring eyes E.

Figure 2:
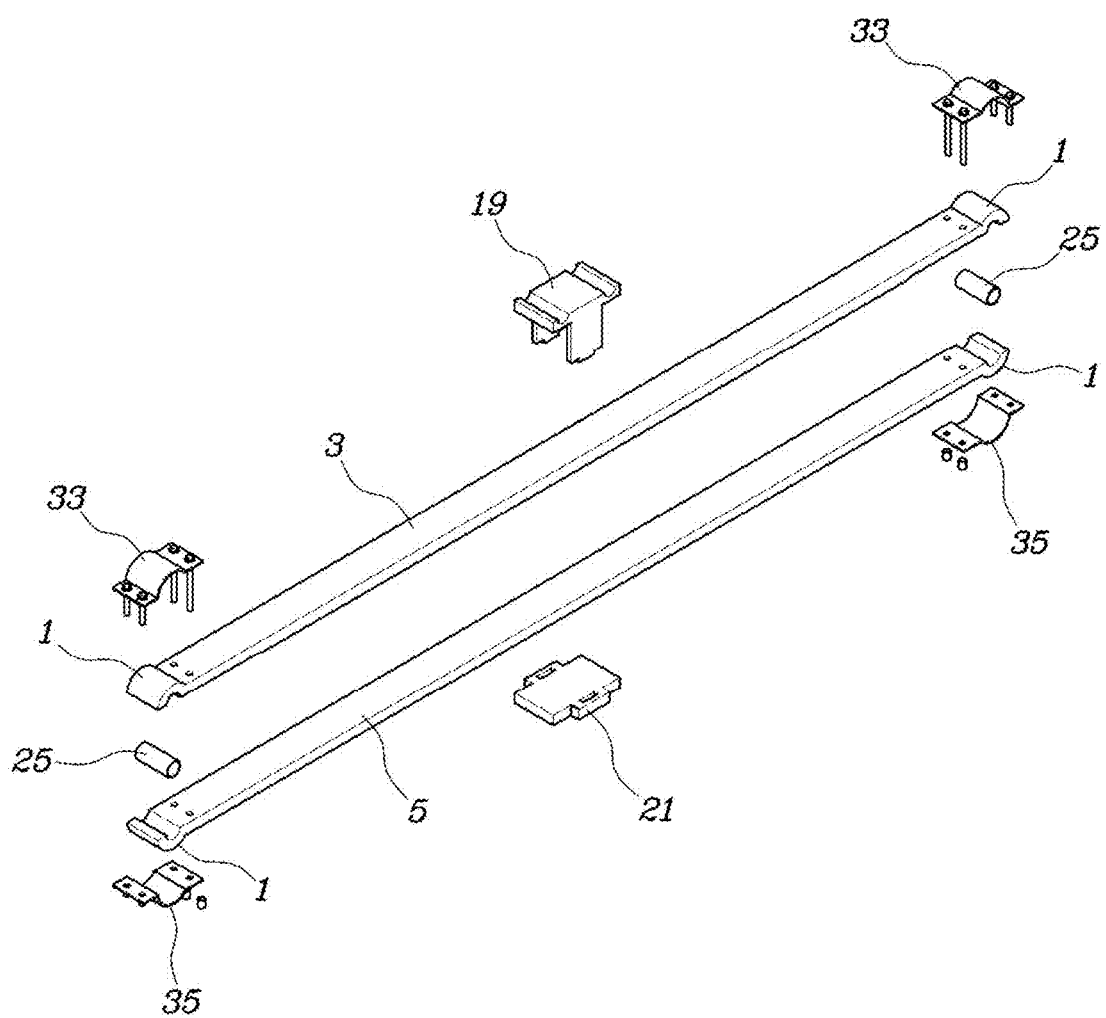
FIG. 2 is an exploded perspective view of the leaf spring of FIG. 1.

That is, although the upper plate 3 and the lower plate 5 may be configured as separate members and overlap each other to constitute the leaf spring of the present disclosure, as can be confirmed in FIGS. 1 and 2, two members having the substantial same shape may be manufactured to use one of these member as the upper plate 3 and use the other as the lower plate 5, and so the number of members desired for management can be reduced, easy assembly can be secured, and ultimately, the cost of manufacturing leaf springs can be reduced.

The clamping unit 7 includes an upper sheet 33 provided with an arc-shaped cross-sectional portion 29 surrounding the arc-shaped portion 1 of the upper plate 3 and flat portions 31 extending from both sides of the arc-shaped cross-sectional portion 29, respectively; a lower sheet 35 provided with an arc-shaped cross-sectional portion 29 surrounding the arc-shaped portion 1 of the lower plate 5 and flat portions 31 extending from both sides of the arc-shaped cross-sectional portion 29, respectively; and a plurality of fastening means passing through and fastening the upper sheet 33 and the lower sheet 35 placed on an upper side and a lower side of the overlapped upper and lower plates 3 and 5, respectively.

That is, the fastening means may secure a coupling state of the upper sheet 33 and the lower sheet 35 in a state in which the upper sheet 33 and the lower sheet 35 overlap the upper side and the lower side of each of the both end portions of the overlapped upper and lower plates 3 and 5, respectively.

The upper sheet 33 and the lower sheet 35 may be formed to have the same shape, and may be symmetrically coupled to each other in a state in which the overlapped upper and lower plates 3 and 5 are interposed therebetween.

That is, although separate members having shapes which slightly differ from each other may be employed as the upper sheet 33 and the lower sheet 35, by forming the above sheets to have the same shape, as in the present form, the number of the members desired for management can be reduced and easy assembly can be secured, and ultimately it is reduce the cost of manufacturing the leaf spring.

In addition, the upper sheet 33 and the lower sheet 35 can be mass-produced by simply press-processing a flat plate, and so the cost for manufacturing the leaf spring of the present disclosure can be further reduced.

On the other hand, in a state in which the upper sheet 33 and the lower sheet 35 are placed on the upper side and the lower side of the overlapped upper and lower plates 3 and 5, respectively, a second gap G2 is formed between the outer flat portion 31 of the upper sheet 33 and the outer flat portion 31 of the lower sheet 35 before the upper and lower sheets are tightened by the fastening means.

The fastening means includes at least one first bolt 37 passing through and fastening the inner flat portion 31 of the upper sheet 33, the upper plate 3, the lower plate 5 and the inner flat portion 31 of the lower sheet 35 to reduce the first gap G1; and at least one second bolt 39 passing through and fastening the outer flat portion 31 of the upper sheet 33 and the outer flat portion 31 of the lower sheet 35 to reduce the second gap G2.

For reference, "the inner flat portion" refers to the flat portion 31 facing toward the central fastening unit 9, and "the outer flat portion" refers to the flat portion 31 opposite to the inner flat portion with respect to the arc-shaped cross-sectional portion 29.

Of course, nuts 41 are coupled to the first bolt 37 and the second bolt 39 to generate a coupling force, respectively, and at this time, the first gap G1 and the second gap G2 counteract to a force which is applied by the first bolt 37 and the second bolt 39 together with the nuts 41 in a direction in which a distance between the upper sheet 33 and the lower sheet 35 is reduced, respectively, and thus act in a direction in which elastic forces of the upper plate 3 and the lower plate 5 widen a gap between the upper plate 3 and the lower plate 5. As a result, a friction force between a head of each of the first bolt 37 and the second bolt 39 and the upper sheet 33 and between the nut 41 and the lower sheet 35 can be sufficiently secured to enable a secure fastening state of the first bolt 37 and the second bolt 39 to be obtained.

Figure 3:
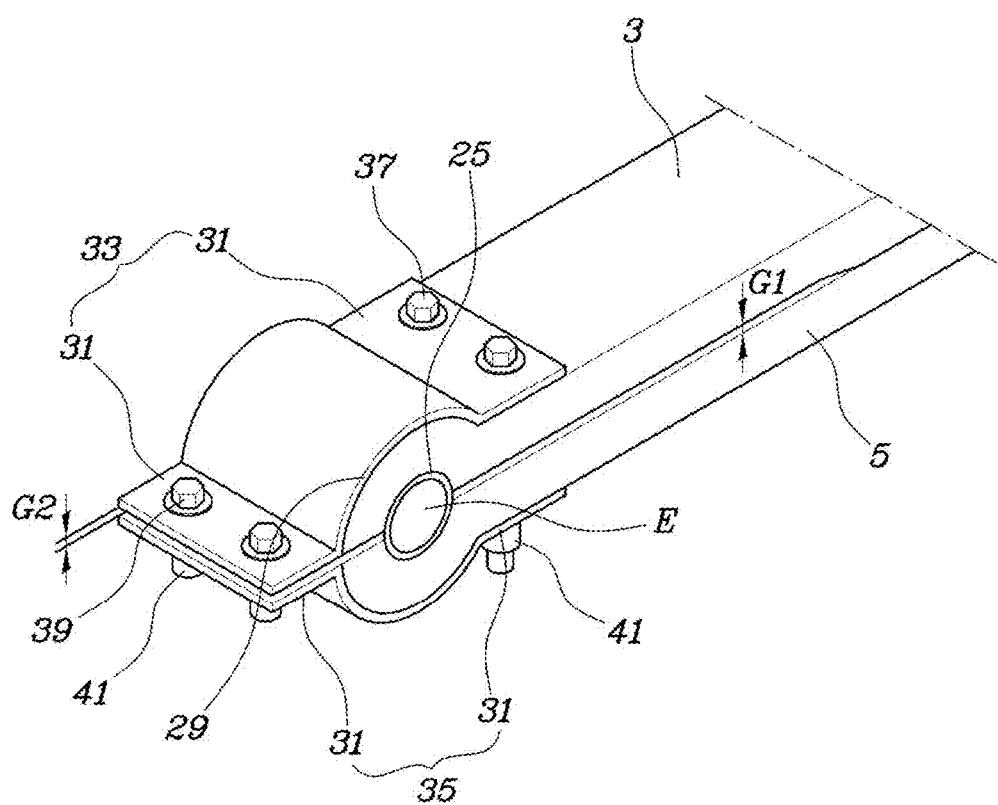
FIG. 3 is a view illustrating a part of FIG. 1 in detail.

In addition, as illustrated in FIGS. 3 and 4, the arc-shaped cross-sectional portion 29 of the upper sheet 33 and the arc-shaped cross-sectional portion 29 of the lower sheet 35 are coupled to each other by the first bolt 37 and the second bolt 39 in a state in which two portions 29 surround the arc-shaped portion 1 of the upper plate 3 and the arc-shaped portion 1 of the lower plate 5, respectively, and so a movement of the upper sheet 33 and the lower sheet 35 with respect to the upper plate 3 and the lower plate 5 is structurally suppressed, and an even distribution of stresses generated at the end portions of the upper plate 3 and the lower plate 5 may be formed to keep a more secure and stable coupling state.

The leaf spring of the present disclosure made of a composite material is capable of further reducing a weight of vehicle with a simple configuration, and effectively distributing stress in a region where stress can be concentrated, thereby increasing robustness thereof and reducing the manufacturing cost.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A leaf spring comprising;
    an upper plate provided with first arc-shaped portions which are integrally famed on both end portions thereof, respectively, for forming spring eyes;
    a lower plate disposed to overlap a lower side of the upper plate and provided with second arc-shaped portions which are integrally formed on both end portions thereof, and configured to respectively face the first arc-shaped portions of the upper plate to form the spring eyes;
    clamping units configured to restrain the both end portions of the overlapped upper and lower plates from being separated from each other; and
    a central fastening unit configured to fasten central portions of the overlapped upper and lower plates.

2. The leaf spring of claim 1, wherein a bush is inserted into each of the spring eyes formed by the first and second arc-shaped portions of the upper plate and the lower plate.

3. The leaf spring of claim 2, wherein the upper plate and the lower plate are spaced apart from each other to form a first gap near the bush.

4. The leaf spring of claim 3, wherein a depression portion configured to form the first gap is formed on at least one of the upper plate or the lower plate overlapping each other, and the depression portion is formed by depressing a contact surface between the upper plate and the lower plate.

5. The leaf spring of claim 3, wherein a size of the first gap is adjusted by a diameter of the bush inserted into the respective spring eyes.

6. The leaf spring of claim 3, wherein an outer side of the first arc-shaped portions of the upper plate is configured to protrude upward, and an outer side of the second arc-shaped portions of the lower plate is configure to protrude downward.

7. The leaf spring of claim 6, wherein the upper plate and the lower plate are formed to have the same shape and are symmetrically coupled to each other to form the spring eyes.

8. The leaf spring of claim 6, wherein each clamping unit of the clamping units comprises:
    an upper sheet provided with an arc-shaped cross-sectional portion surrounding the first arc-shaped portion of the upper plate and flat portions extending from both sides of the arc-shaped cross-sectional portion of the upper sheet, respectively;
    a lower sheet provided with an arc-shaped cross-sectional portion surrounding the second arc-shaped portion of the lower plate and flat portions extending from both sides of the arc-shaped cross-sectional portion of the lower sheet, respectively; and
    a plurality of fasteners configured to pass through and fasten the upper sheet and the lower sheet placed on an upper side and a lower side of the overlapped upper and lower plates, respectively.

9. The leaf spring of claim 8, wherein the upper sheet and the lower sheet are formed to have the same shape, and are symmetrically coupled to each other in a state in which the overlapped upper and lower plates are interposed therebetween.

10. The leaf spring of claim 8, wherein, in a state in which the upper sheet and the lower sheet are placed on the upper side and the lower side of the overlapped upper and lower plates, respectively, a second gap is formed between an outer flat portion of the upper sheet and an outer flat portion of the lower sheet before the upper and lower sheets are tightened by the plurality of fasteners.

11. The leaf spring of claim 10, wherein the plurality of fasteners comprises:
- at least one first bolt configured to pass through and fasten an inner flat portion of the upper sheet, the upper plate, the lower plate, and an inner flat portion of the lower sheet so as to reduce the first gap; and
- at least one second bolt configured to pass through and fasten the outer flat portion of the upper sheet and the outer flat portion of the lower sheet so as to reduce the second gap.

* * * * *